United States Patent
Harada et al.

(10) Patent No.: US 8,112,589 B2
(45) Date of Patent: Feb. 7, 2012

(54) SYSTEM FOR CACHING DATA FROM A MAIN MEMORY WITH A PLURALITY OF CACHE STATES

(75) Inventors: Nobuyuki Harada, Tokyo (JP); Takeo Nakada, Saitama-ken (JP)

(73) Assignee: International Business Machines Corporation, Armonk, NY (US)

( * ) Notice: Subject to any disclaimer, the term of this patent is extended or adjusted under 35 U.S.C. 154(b) by 989 days.

(21) Appl. No.: 12/037,689

(22) Filed: Feb. 26, 2008

(65) Prior Publication Data

US 2008/0263282 A1 Oct. 23, 2008

(30) Foreign Application Priority Data

Apr. 19, 2007 (JP) ................................. 2007-110453

(51) Int. Cl.
*G06F 12/00* (2006.01)

(52) U.S. Cl. . 711/136; 711/113; 711/160; 711/E12.019; 711/E12.026

(58) Field of Classification Search .................. 711/113, 711/133, 136, 159, 160, E12.019, E12.026
See application file for complete search history.

(56) References Cited

U.S. PATENT DOCUMENTS

| 5,432,919 | A  | * | 7/1995 | Falcone et al. | 711/134 |
| 6,233,700 | B1 | * | 5/2001 | Uchida | 714/20 |
| 7,366,855 | B2 | * | 4/2008 | Kim et al. | 711/160 |
| 2004/0083341 | A1 | * | 4/2004 | Robinson et al. | 711/133 |
| 2004/0103241 | A1 | * | 5/2004 | Chang et al. | 711/103 |
| 2006/0069875 | A1 | * | 3/2006 | Lai | 711/133 |

FOREIGN PATENT DOCUMENTS

JP 2004-303232 10/2004

* cited by examiner

*Primary Examiner* — Shane M Thomas
(74) *Attorney, Agent, or Firm* — Robert R. Williams

(57) ABSTRACT

To ensure efficient access to a memory whose writing process is slow. There is provided a storage device for caching data read from a main memory and data to be written in the main memory, comprises a cache memory having a plurality of cache segments, one or more cache segments holding data matching with data in the main memory being set in a protected state to protect the cache segments from a rewrite state, an upper limit of a number of the one or more cache segments being a predetermined reference number; and a cache controller that, in accordance with a write cache miss, allocates a cache segment selected from those cache segments which are not in the protected state to cache write data and writes the write data in the selected cache segment.

13 Claims, 19 Drawing Sheets

SYSTEM FOR CACHING DATA FROM A MAIN MEMORY WITH A PLURALITY OF CACHE STATES

FIELD OF THE INVENTION

The present invention relates to a technique of caching data. Particularly, the present invention relates to a technique of storing data read from a main memory and data to be written in the main memory in a cache memory.

BACKGROUND OF THE INVENTION

Recently, non-volatile memory devices, such as a NAND type flash memory, are used. Such a memory device may take a considerably longer time for data writing than a time needed for data reading. This is because an erasure operation is possible only in a large data size of a block, so that even writing data with a smaller data size requires three processes (a) reading from the entire block, (b) changing read-out data, and (c) writing in the entire block.
[Patent Document 1]
Japanese Unexamined Patent Publication (Kokai) No. 2004-303232

SUMMARY OF THE INVENTION

One way to overcome the problem may be application of a technique relating to a cache memory for achieving efficient access to a main memory from a CPU. In a case of writing data with a small data size, for example, the data can be temporarily written in the cache memory so that when a certain size of data is stored in the cache memory, the whole data is written in a flash memory, thereby reducing the number of writing actions to speed up the writing. A so-called write-back cache is available as a specific technique of caching write data.

However, application of the write-back cache technique to a flash memory may bring about an inconvenient case. Specifically, such inconvenience may occur when a cache memory is full of data which should be written in the main memory but has not been written therein yet. In this case, when a read request is issued later, some data in the cache memory should be written back in the main memory in order to secure an area for caching read-out data. The write-back process takes a considerable time when a flash memory is used as the main memory. It therefore takes a significant time for a read process which should originally be completed quickly.

It is also possible to apply a technique of independently providing a read-only cache memory and a write-only cache memory to prevent the cache memory from becoming full of data to be written in the main memory. However, this technique involves a control process for data consistency, which may complicate the circuit configuration.

The aforementioned Patent Document 1 is a reference technical document relevant to a cache device. According to the technique, a memory area which can be accesses later (e.g., area located in the address-descending direction) is predicted based on an address (e.g., the address of a stack pointer) output from an arithmetic operation unit, and then data is read in advance from the memory area. This technique is premised on the presence of a specific address value of a stack pointer or the like, and cannot be widely applied to various kinds of read processes. Further, in case of consecutive writing, even the technique needs a considerable time needed for subsequent data reading.

Accordingly, it is an object of the present invention to provide a storage device and a method which can solve the problems. The object is achieved by combinations of the features described in independent claims in the appended claims. Dependent claims define further advantageous specific examples of the present invention.

To overcome the problems, according to one aspect of the present invention, there are provided a storage device for caching data read from a main memory and data to be written in the main memory, comprising a cache memory having a plurality of cache segments, one or more cache segments holding data matching with data in the main memory being set in a protected state to protect the cache segments from a rewrite state, an upper limit of a number of the one or more cache segments being a predetermined reference number; and a cache controller that, in accordance with a write cache miss, allocates a cache segment selected from those cache segments which are not in the protected state to cache write data and writes the write data in the selected cache segment, and a method of controlling the storage device.

The summary of the present invention does not recite all the necessary features of the invention, and sub combinations of those features may also encompass the invention.

DETAILED DESCRIPTION OF THE INVENTION

The present invention will be described below by way of examples. However, an embodiment and modifications thereof described below do not limit the scope of the invention recited in the appended claims, or all the combinations of the features of the embodiment to be described should not necessarily be the means for solving the invention.

Figure 1:
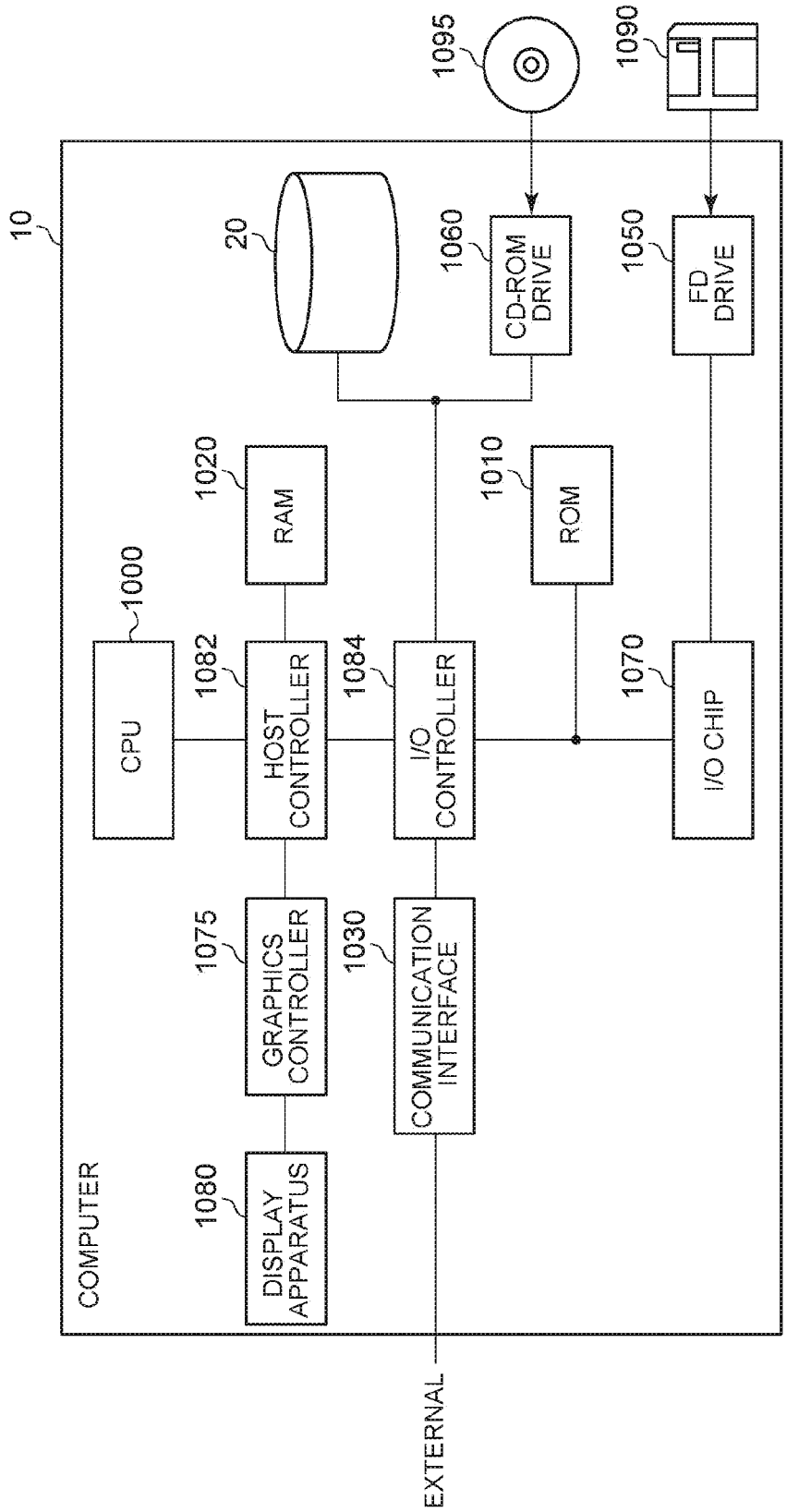
FIG. 1 is a diagram showing the general configuration of a computer 10 according to the embodiment.

FIG. 1 shows the general configuration of a computer 10 according to the embodiment. The computer 10 includes a CPU peripheral section having a CPU 1000, a RAM 1020 and a graphics controller 1075, which are mutually connected by a host controller 1082. The computer 10 also includes an input/output (I/O) section having a communication interface 1030, a storage device 20 and a CD-ROM drive 1060, which are connected to the host controller 1082 by an I/O controller 1084. The computer 10 may further include a legacy I/O section having a ROM 1010, a flexible disk drive 1050 and an I/O chip 1070, which are connected to the I/O controller 1084.

The host controller 1082 connects the RAM 1020 to the CPU 1000 and the graphics controller 1075, which accesses the RAM 1020 at a high transfer rate. The CPU 1000 operates to control the individual sections based on programs stored in the ROM 1010 and the RAM 1020. The graphics controller 1075 acquires image data which is generated by the CPU 1000 or the like on a frame buffer provided in the RAM 1020. Instead, the graphics controller 1075 may include a frame buffer inside to store image data generated by the CPU 1000 or the like.

The I/O controller 1084 connects the host controller 1082 to the communication interface 1030, the storage device 20 and the CD-ROM drive 1060, which are relatively fast I/O devices. The communication interface 1030 communicates with an external device over a network. The storage device 20 stores programs and data which the computer 10 uses. The storage device 20 may be a device capable of holding data in a non-volatile manner, such as a flash memory, or a hard disk drive. The CD-ROM drive 1060 reads programs and data from a CD-ROM 1095, and provides the RAM 1020 or the storage device 20 with the programs and data.

The I/O controller 1084 is connected with relatively slow I/O devices, such as the flexible disk drive 1050 and the I/O chip 1070. The ROM 1010 stores a boot program which is executed by the CPU 1000 when the computer 10 is activated, and programs or the like which depend on the hardware of the computer 10. The flexible disk drive 1050 reads programs and data from a flexible disk 1090, and provides the RAM 1020 or the storage device 20 with the programs and data via the I/O chip 1070. The I/O chip 1070 connects flexible disk 1090 to various kinds of I/O devices via, for example, a parallel port, a serial port, a keyboard port, a mouse port and so forth.

The programs that are supplied to the computer 10 are stored in a recording medium, such as the flexible disk 1090, the CD-ROM 1095 or an IC card, to be provided to a user. Each program is read from the recording medium via the I/O chip 1070 and/or the I/O controller 1084, and is installed on the computer 10 to be executed. The programs described above may be stored in an external storage medium. An optical recording medium, such as DVD or PD, a magnetooptical recording medium, such as MD, a tape medium, a semiconductor memory, such as an IC card, and the like can be used as storage mediums besides the flexible disk 1090 and the CD-ROM 1095.

Although the computer 10 is exemplified in the embodiment as one having the storage device 20, the storage device 20 may be provided in any other device or system. A device or system equipped with the storage device 20 may be provided in a portable or mobile device, such as a USB memory device, a cellular phone, a PDA device, an audio player or a car navigation system, or may be a desktop type device, such as a file server or NAS (Network Attached Storage).

Figure 2:
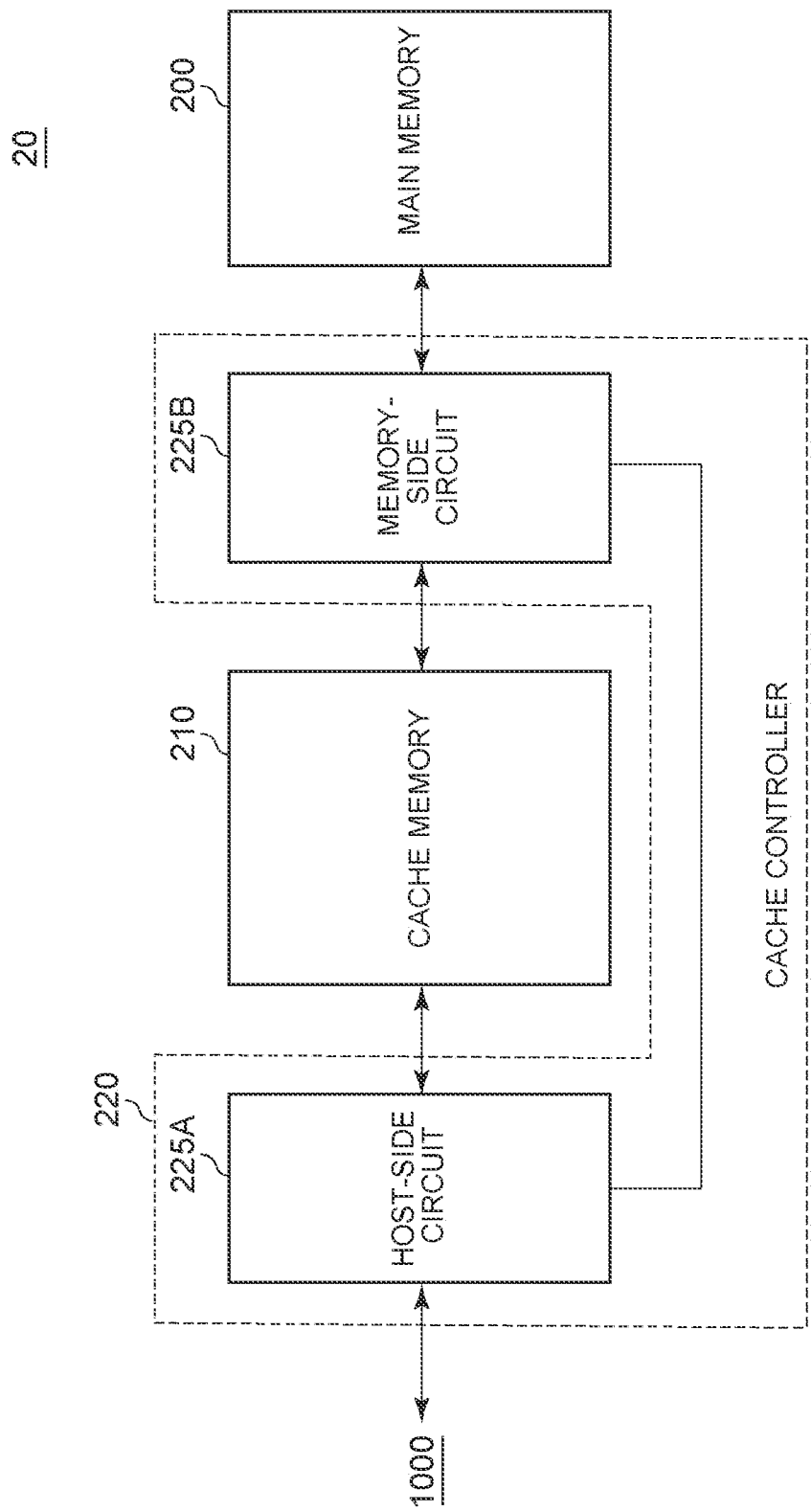
FIG. 2 is a diagram showing the functional structure of the storage device 20.

FIG. 2 shows the functional structure of the storage device 20. The storage device 20 has a main memory 200, a cache memory 210 and a cache controller 220. The storage device 20 is accessed by a CPU 1000 via the host controller 1082 or the I/O controller 1084. The main memory 200 is a non-volatile semiconductor device, such as a flash memory, to store data output from the CPU 1000. Alternatively, the main memory 200 may include at least one of a hard disk drive, a magnetooptical disk drive and a tape drive. The cache memory 210 caches data read from the main memory 200 to be supplied to the CPU 1000, or caches data to be written in the main memory 200 from the CPU 1000. The cache memory 210 operates considerably faster particularly in writing data, as compared with the main memory 200. Accordingly, the process efficiency of the storage device 20 as a whole can be enhanced by storing data to be written in the cache memory 210 and the collectively writing the stored data back in the main memory 200.

The cache controller 220 is realized by an electronic circuit, such as a logic circuit, a programmable circuit or a microcontroller, and specifically, has a host-side circuit 225A and a memory-side circuit 225B. In response to a read request received from the CPU 1000, the host-side circuit 225A reads data from the cache memory 210 and outputs the data to the CPU 1000. In response to a write request received from the CPU 1000, the host-side circuit 225A writes data in the cache memory 210. When data requested to be read out is not stored in the cache memory 210, the memory-side circuit 225B reads the data from the main memory 200 and stores the data in the cache memory 210. When a predetermined condition is met, the memory-side circuit 225B writes data written in the cache memory 210 back in the main memory 200.

Figure 3:
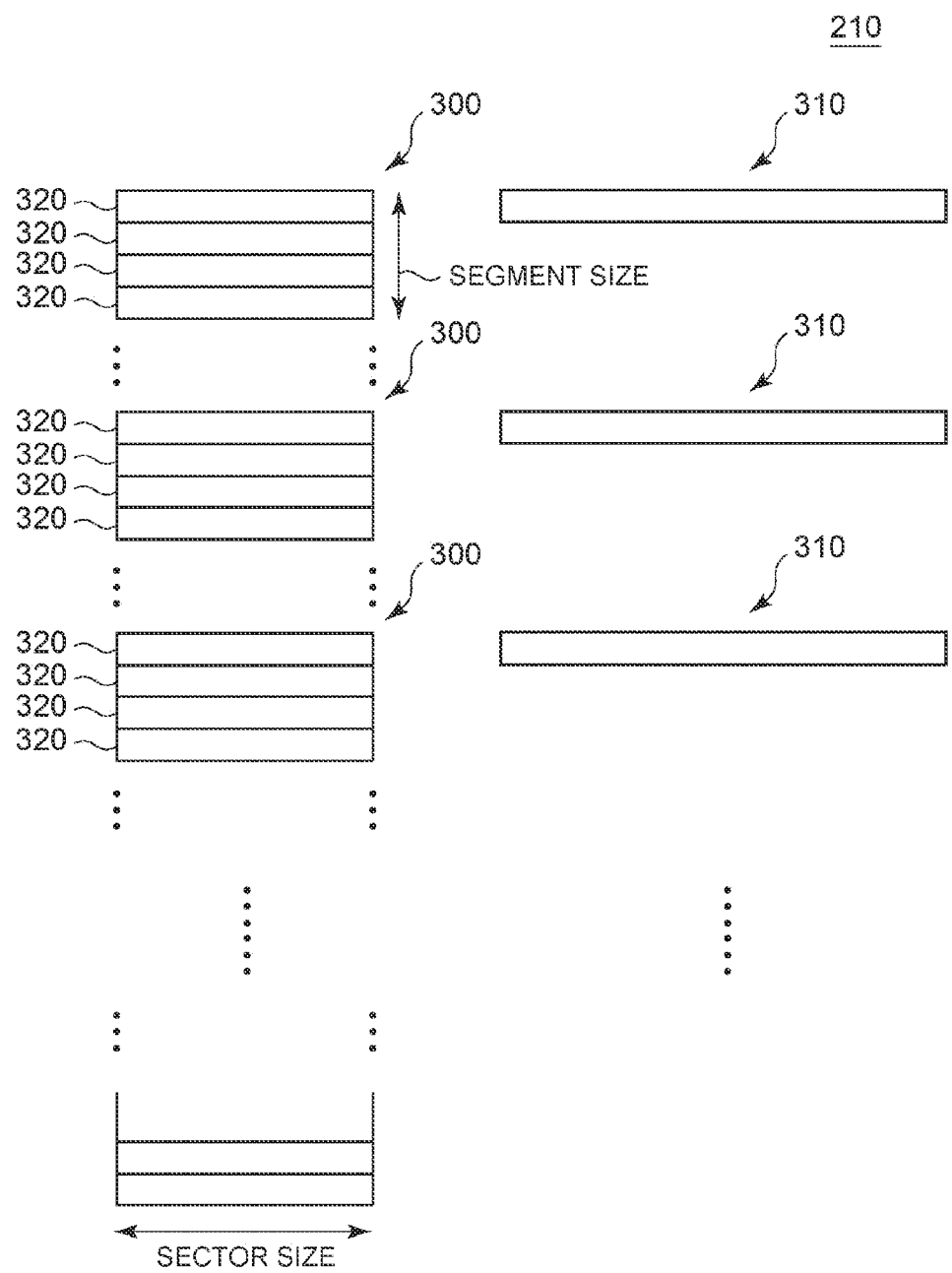
FIG. 3 is a diagram showing a data structure in a cache memory 210.

FIG. 3 schematically shows a data structure in the cache memory 210. The cache memory 210 has a plurality of cache segments 300, and tags 310 respectively associated with the cache segments 300. The memory area of the cache memory 210 is allocated to the main memory 200 with the cache segments as units. That is, the memory area of the cache memory 210 has a smaller data size than the memory area of the main memory 200, and each cache segment 300 is allocated to any one of segments in the main memory 200 as needed. A cache segment 300 to be allocated and a segment in the main memory 200 which is allocated to that cache segment 300 have the same data size.

Each cache segment 300 may include a plurality of sectors 320. The number of sectors 320 included in one cache segment 300 is preferably 2 to the power of an integer, and is four, for example. In this case, the value of a boundary address between one cache segment 300 and another cache segment 300 is the data size of the sector 320 multiplied by 2 to the power of an integer, and is four times the data size, for example. The data size of the cache segment 300 may be the same as a data write unit to the main memory 200, for example. In this case, when the cache segment 300 only partly includes data to be written, the cache memory 210 reads data from the main memory 200 into another part of the cache segment 300, and writes data in the cache segment 300 back in the main memory 200. Alternatively, the data write unit may be a block including two or more cache segments 300 having consecutive addresses. The data read unit in the main memory 200 is smaller than the data write unit, and is equivalent to a plurality of sectors, for example.

The tag 310 includes at least information indicating to which segment in the main memory 200 the corresponding cache segment 300 is allocated. The tag 310 will be described in detail below.

Figure 4:
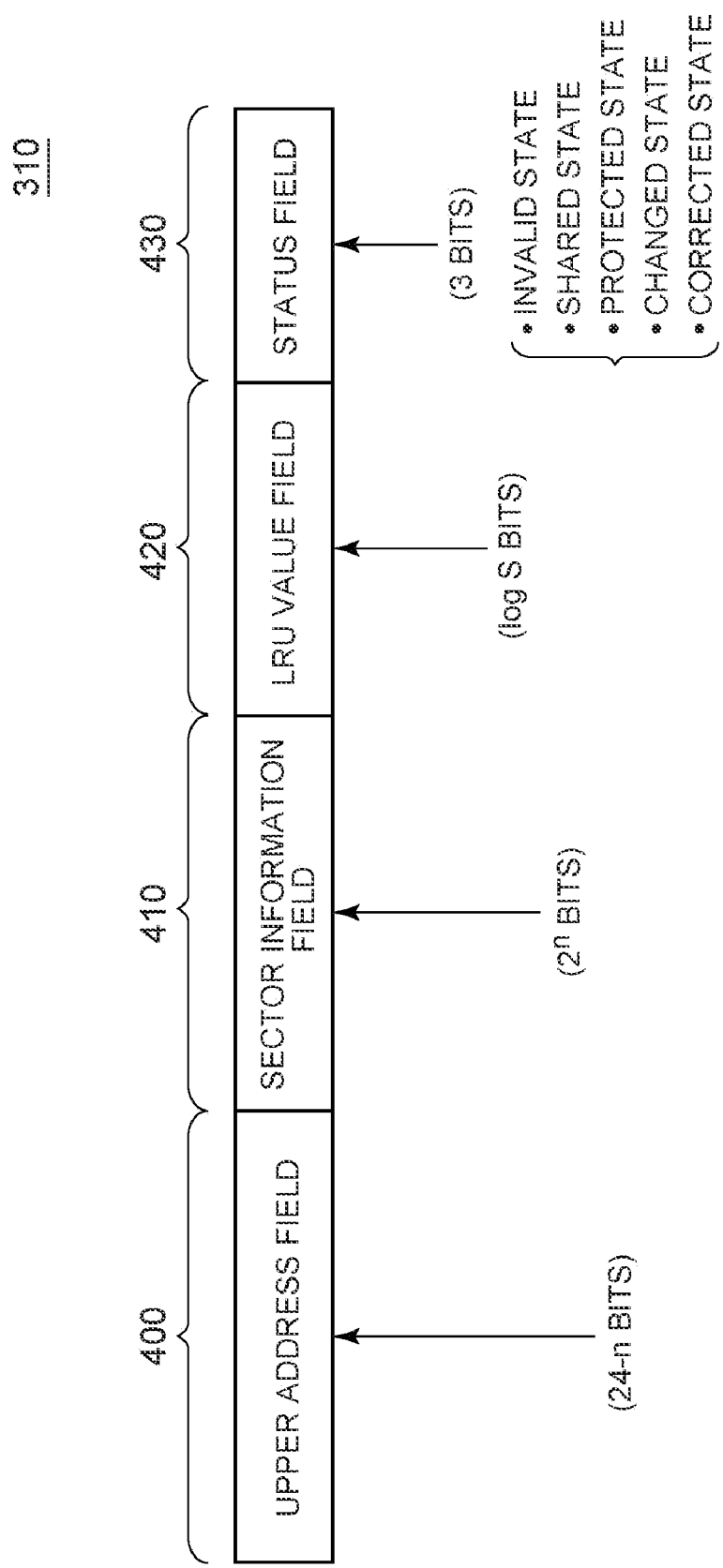
FIG. 4 is a diagram showing one example of the data structure of a tag 310.

FIG. 4 shows one example of the data structure of the tag 310. The cache memory 210 has an upper address field 400, a sector information field 410, an LRU value field 420 and a status field 430 as data fields for storing the tag 310. The upper address field 400 stores an address value of a predetermined digits from the topmost one of address values of segments in the main memory 200 to which the corresponding cache segments 300 are allocated. When an address in the main memory 200 is expressed by 24 bits, for example, an address value of upper (24-n) bits which is lower n bits excluded from the address is stored in the upper address field 400. This address value is called an upper address or an upper address value. The address from which the upper address is excluded is called a lower address or a lower address value.

When the upper address value is expressed by (24-n) bits and each sector is specifically determined by the lower address value, the number of sectors 320 included in one cache segment 300 is $2^n$. Therefore, information indicating whether each sector 320 included in a cache segment 300 includes valid data is expressed by $2^n$ bits. This information is called sector information, which is stored in the sector information field 410. The LRU value field 420 stores an LRU (Least Recently Used) value. As implied by the name "Least Recently Used", the LRU value is an index value indicating an unused period.

Specifically, an LRU value may indicate the long order of unused periods or the short order of unused periods for a corresponding cache segment 300. Here, "used" means that a corresponding cache segment 300 has been subjected to at least one of a read process and a write process to be executed by the CPU 1000. More specifically, when a plurality of cache segments 300 are given an order according to the length, long or short, of the unused period, an LRU value is a value whose upper limit is the number of cache segments 300. Therefore, the LRU value field 420 that stores the LRU value needs bits expressed by a logarithm of a segment number S with base "2".

The status field 430 stores a state in which a corresponding cache segment 300 is set. The state is expressed by, for example, 3 bits, and each cache segment 300 is set to any one of a plurality of states including an invalid state, a shared state, a protected state, a changed state and a corrected state. The individual states will be briefly described below. The invalid state indicates the state of a cache segment 300 all of whose sectors 320 included therein are invalid sectors. An invalid sector neither holds data matching with data in the main memory 200, nor holds data requested by the CPU 1000 as data to be written in the main memory 200. In an initial state, such as when the computer 10 is activated, all the cache segments 300 are in an invalid state.

The shared state indicates the state of a cache segment 300 all of whose sectors 320 are shared sectors, which can however be replaced with respect to data writing. A shared sector is a valid sector holding data matching with data in the main memory 200. The protected state indicates the state of a cache segment 300 all of whose sectors 320 are shared sectors and protected against rewriting. The changed state and the corrected state are examples of an update state according to the present invention, where data which does not match with data in the main memory 200 and is to be written in the main memory 200 is included. A cache segment 300 in the changed state has some of its sectors 320 including data to be written in the main memory 200, whereas a cache segment 300 in the corrected state has all the sectors 320 including data to be written in the main memory 200. Such a sector 320 is called "changed sector". A changed sector is a valid sector.

Because general techniques of defining the state of a cache segment and transitioning the state are well known as, for example, the MSI protocol, the MESI protocol or the MOESI protocol, those techniques should be referred to for other embodiments and other details.

Figure 5:
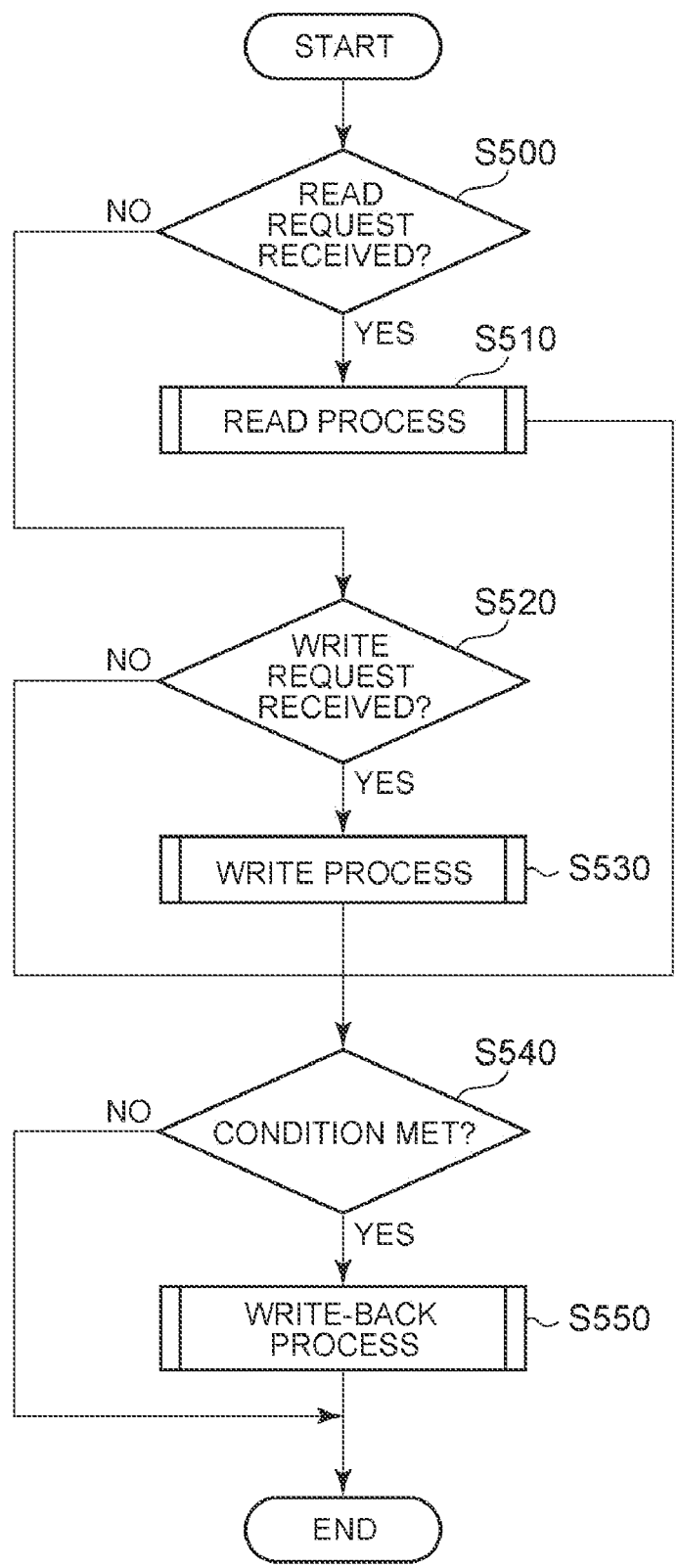
FIG. 5 is a flowchart illustrating processes which are executed by a cache controller 220.

FIG. 5 illustrates a flowchart of processes which are executed by the cache controller 220. The cache controller 220 executes the following processes in response to a write request or read request from the CPU 1000 or regularly at a predetermined interval. When receiving a read request (S500: YES), the cache controller 220 executes a read process (S510). Specifically, the cache memory 210 reads data from the cache memory 210 and outputs the data to the CPU 1000 when requested data is stored in the cache memory 210, but reads data from the main memory 200 and outputs the data to the CPU 1000 when requested data is not stored in the cache memory 210.

When receiving a write request (S520: YES), the cache controller 220 executes a write process (S530). Specifically, when a cache segment 300 for writing data whose write request has been made has already been allocated, the cache memory 210 writes data in that cache segment 300. If such a cache segment 300 is not allocated, however, the cache controller 220 allocates a cache segment 300 for newly writing the data, and writes the data in the allocated cache segment 300. Regardless of whether a request has been received, the cache controller 220 determines if a predetermined condition is satisfied (S540).

When the predetermined condition is satisfied (S540: YES), the cache controller 220 writes data in a cache segment 300 in the changed state or the corrected state back in the main memory 200. The state of the cache segment 300 subjected to the write back is changed to a shared state. A specific example of the condition is whether a predetermined time has elapsed since the condition has been met previously. The condition may be if the total number of cache segments 300 in the changed state or the corrected state exceeds a reference number. Another example of the condition may be if the total number of cache segments 300 in the shared state or the protected state falls below a predetermined reference number. If the changed state or the corrected state is canceled regardless of a request, even when a new cache segment 300 is allocated later, the write-back process is not needed then, making it possible to shorten the time needed to complete the allocation process.

Figure 6:
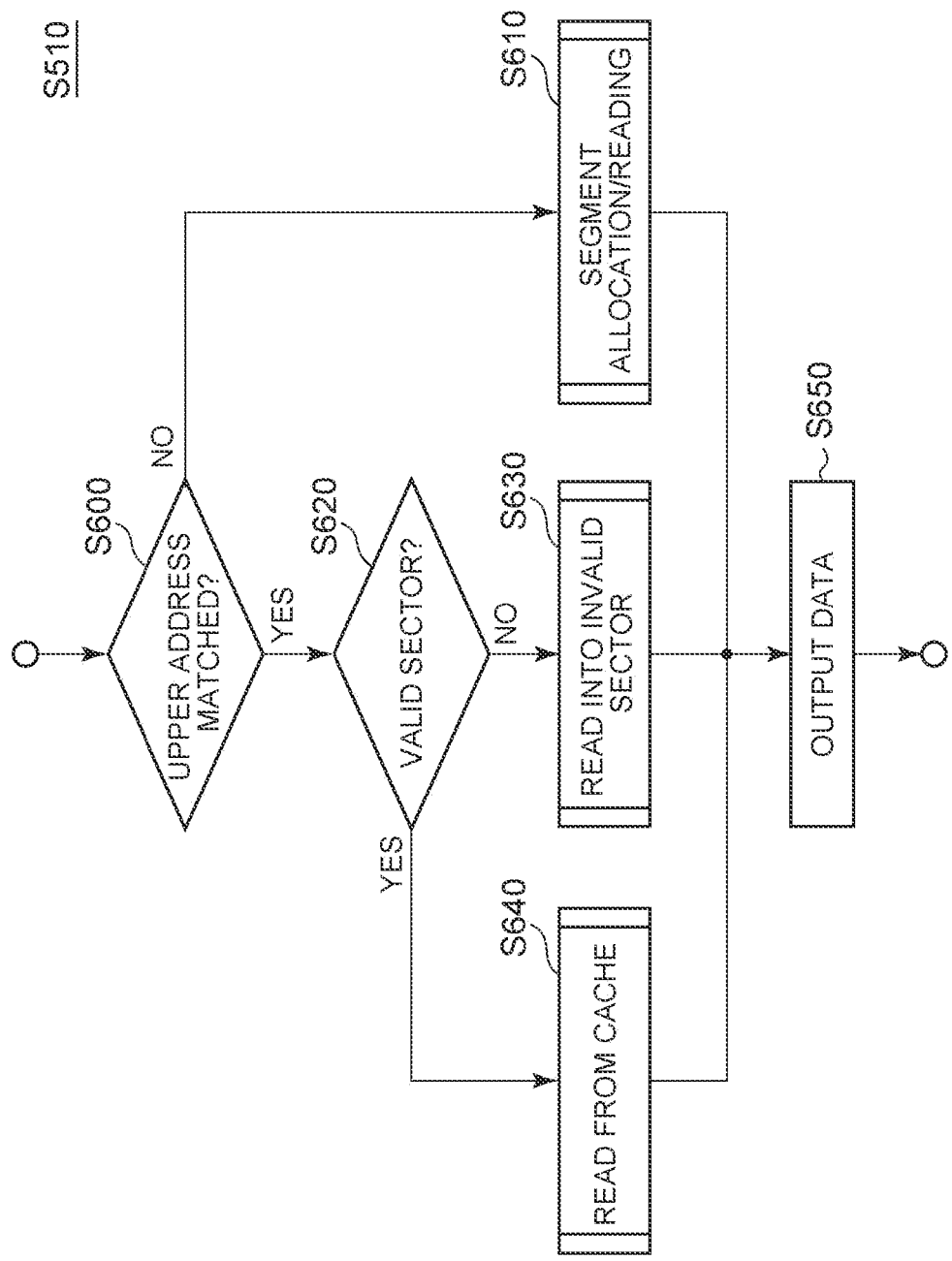
FIG. 6 is a diagram showing the details of the process of S510.

FIG. 6 shows the details of the process of S510. The cache controller 220 determines whether the upper address of a read-requested sector matches with the upper address of any one of cache segments 300, excluding cache segments 300 in the invalid state (S600). This is achieved by, for example, sequentially scanning the upper address fields 400 and the status fields 430 corresponding to the individual cache segments 300, excluding cache segments 300 in the invalid state, and then comparing the addresses of the remaining cache segments 300 with the address targeted for the read request. Under a condition that the read-requested upper address does not match with the upper address of any one of the cache segments 300 (S600: NO), the cache controller 220 allocates one of the cache segments 300 to cache read-out data, and reads data from the main memory 200 into the allocated cache segment 300 (S610).

That the upper address of the read-requested sector does not match with the upper address of any cache segment 300 is called "occurrence of a read cache miss" or simply "read cache miss". Then, the cache controller 220 outputs the read-out data to the CPU 1000 (S650). The order of a data output process (S650) and the process of reading data into the cache memory 210 (S610) is not limited to the aforementioned order, and both processes may be carried out simultaneously.

When the upper address of the read-requested sector matches with the upper address of any cache segment 300 (S600: YES), the cache controller 220 determines whether the read-requested address is the upper address of a valid sector (S620). This is achieved by, for example, referring to the sector information field 410 of the tag 310 corresponding to the cache segment 300. In case of a valid sector (S620: YES), the cache controller 220 reads data from the valid sector (S640), and outputs the data to the CPU 1000. When the target sector is not a valid sector (S620: NO), the cache controller 220 acquires data from a corresponding sector in the main memory 200 for the invalid sector of the cache segment 300 (S630), and outputs requested data in the read-out data (S650). The order of those processes for the cache memory 210 and the data outputting order are not limited to the foregoing orders.

Figure 7A:
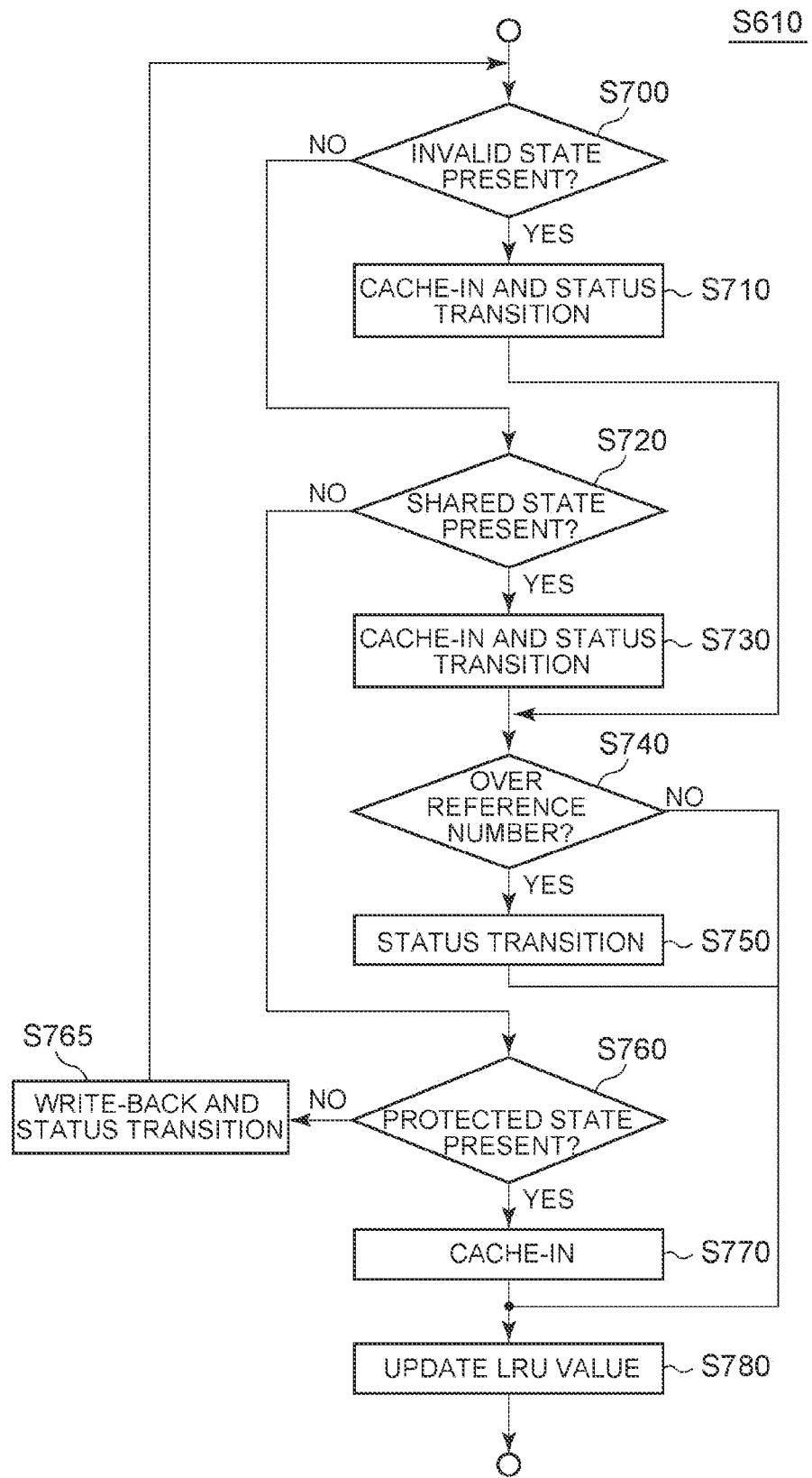
FIG. 7A is a diagram showing the details of the process of S610.
Figure 7B:
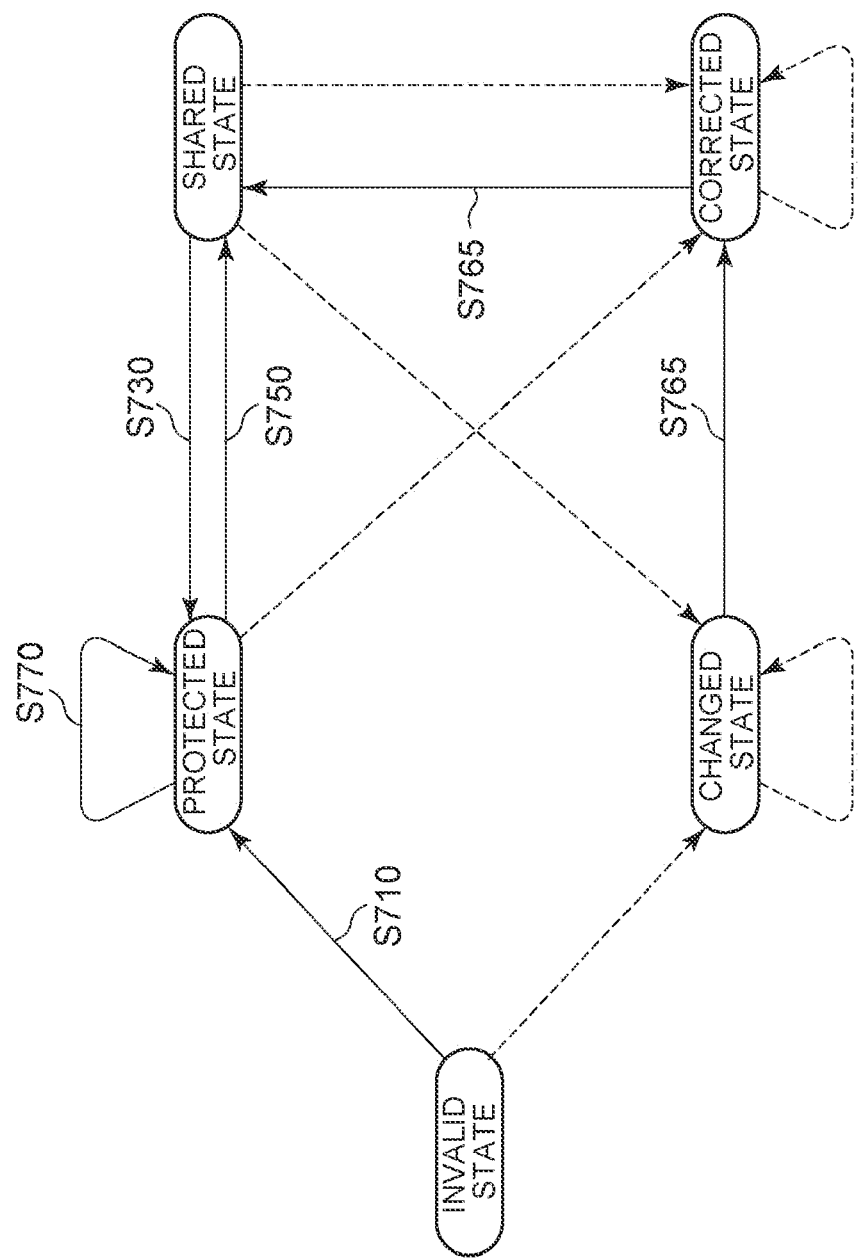
FIG. 7B is a diagram showing a possible status transition in the process of S610.

FIG. 7A shows the details of the process of S610. FIG. 7B shows a possible status transition in the process of S610. Referring to FIGS. 7A and 7B, the details of the process of S610 will be described below. First, the cache controller 220 determines whether the cache memory 210 includes any cache segment 300 in the invalid state (S700). This determination is achieved by referring to the status field 430. Since a process of determining the state of a cache segment 300, a process of determining if a cache segment 300 in one state is included in the cache memory 210, and a process of transitioning (or setting) the state of a cache segment 300 to one state are achieved by referring to or updating the status field 430, the description of the processes will be omitted.

Under a condition that the cache memory 210 includes a cache segment 300 in the invalid state (S700: YES), the cache controller 220 selects and allocates the cache segment 300 to cache read-out data, reads data from the main memory 200 into the selected cache segment 300, and sets the state of the cache segment 300 to the protected state (S710). The allocation of a cache segment 300 is achieved by, for example, writing the upper address of a read-requested address sector in the main memory 200 in the upper address field 400 corresponding to the cache segment 300. According to the allocation, the cache controller 220 resets an LRU value corresponding to the cache segment 300 to a value indicating the shortest unused period. This data reading from the main memory 200 into the cache memory 210 is called "cache-in", as needed, to be distinguished from data reading from the cache memory 210.

When the cache memory 210 does not include a cache segment 300 in the invalid state (S700: NO), the cache controller 220 determines whether the cache memory 210 includes a cache segment 300 in the shared state (S720). As a read cache miss has occurred at the time of making the determination, the determination target is a cache segment 300 which is allocated to store data other than the read-requested data. Under a condition that the cache memory 210 includes a cache segment 300 in the shared state (S720: YES), the cache controller 220 selects and allocates the cache segment 300 to cache read-out data, reads data from the main memory 200 into the selected cache segment 300, and sets the state of the cache segment 300 to the protected state (S730). According to the allocation, the cache controller 220 resets an LRU value corresponding to the cache segment 300 to a value indicating the shortest unused period.

Next, according to the allocation of the cache segment 300, the cache controller 220 determines whether the number of management device 30 in the protected state exceeds a predetermined reference number (S740). When the number exceeds the predetermined reference number (S740: YES), the cache controller 220 selects and sets another cache segment 300 in the protected state to the shared state (S750). It is preferable that the cache controller 220 should select a cache segment 300 whose LRU value indicates the longest unused period. This can allow the cache memory 210 to set one or more cache segments holding data matching with data in the main memory 200 to the protected state with the predetermined reference number being an upper limit.

When the cache memory 210 includes neither a cache segment 300 in the invalid state nor a cache segment 300 in the shared state (S720: NO), the cache controller 220 determines whether the cache memory 210 includes a cache segment 300 in the protected state (S760). As a read cache miss has occurred at the time of making the determination, the determination target is a cache segment 300 which is allocated to store data other than the read-requested data. Under a condition that the cache memory 210 includes a cache segment 300 in the protected state (S760: YES), the cache controller 220 allocates the cache segment 300 to cache read-out data, reads data from the main memory 200 into the allocated cache segment 300, and keeps setting the state of the cache segment 300 to the protected state (S770). According to the allocation, the cache controller 220 resets an LRU value corresponding to the cache segment 300 to a value indicating the shortest unused period.

In this manner, in response to a read cache miss, the cache controller 220 selects a new cache segment 300 to be allocated from those cache segments 300 which are not in the update state, and newly allocates the cache segment 300 where data is read into. In this case, the cache controller 220 updates (e.g., increments) LRU values corresponding to other cache segments 300 in the same state as the transitioned state to values indicating a longer unused period (S780). If the transitioned state is the protected state, for example, the cache controller 220 changes each of the LRU values corresponding to the cache segments 300 in the protected state other than the newly allocated cache segment 300 to a value indicating a longer unused period. When a cache segment 300 which has originally been in the protected state is allocated, it is desirable to update the LRU values of only those cache segments 300 which indicate a shorter unused period than the LRU value of the cache segment 300 before the allocation. This makes it possible to prevent the LRU value from increasing unlimitedly and to predetermine the number of bits of the LRU value field 420.

Next, under a condition that the cache memory 210 does not include cache segments 300 in any of the invalid state, the shared state and the protected state (S760: YES), the cache controller 220 selects a cache segment 300 in either the changed state or the corrected state as a cache segment 300 subjected to a write-back process (S765). Specifically, the cache controller 220 reads data from the main memory 200 into an invalid sector of the selected cache segment 300, and writes the data in the selected cache segment 300 back into the main memory 200. When both a cache segment 300 in the changed state and a cache segment 300 in the corrected state are present, the cache segment 300 in the corrected state becomes a write-back target by priority over the cache segment 300 in the changed state. Of cache segments 300 in the same state, a cache segment 300 whose LRU value indicates a longer unused period is selected as a write-back target. Those cache segments 300 which have the equal LRU value become a write-back target at the same time. Then, the cache controller 220 sets one or more cache segments 300 subjected to the write-back process to the shared state, and returns the process to S700.

Figure 8:
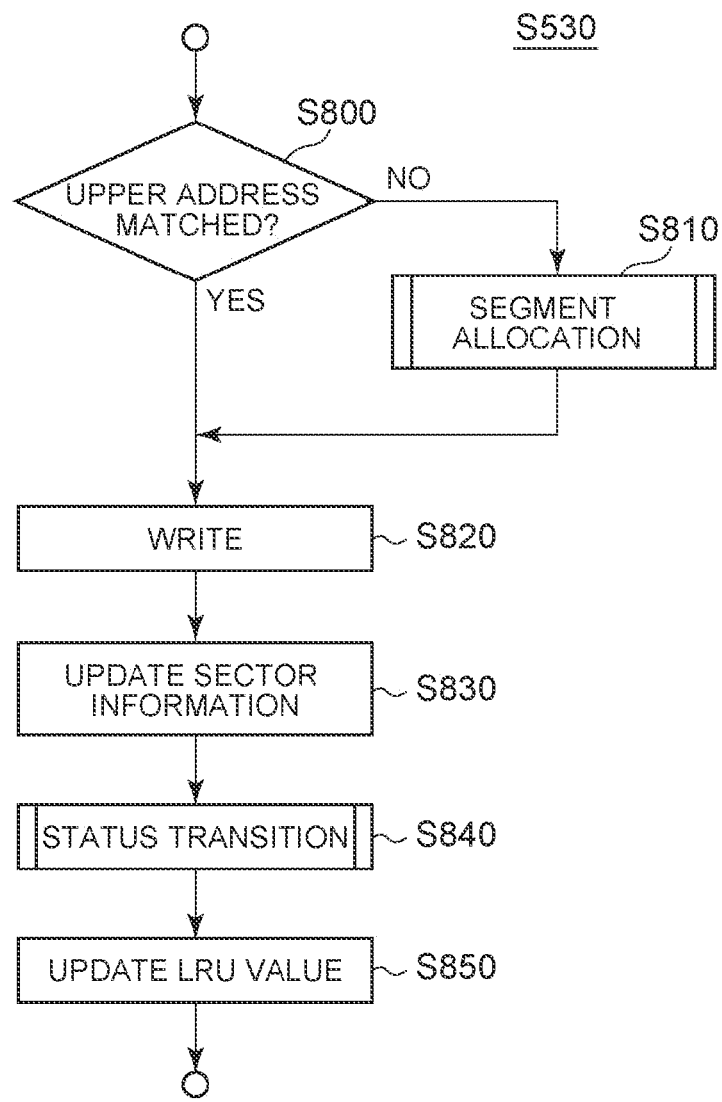
FIG. 8 is a diagram showing the details of the process of S530.

FIG. 8 shows the details of the process of S530. The cache controller 220 determines whether the upper address of a write-requested sector matches with the upper address of any one of cache segments 300 in the invalid state (S800). Under a condition that the write-requested upper address does not match with the upper address of any one of the cache segments 300 (S800: NO), the cache controller 220 selects any cache segment 300 from those cache segments 300 which are not in the protected state, allocates the cache segment 300 to cache data for the write target sector, and sets the state of the cache segment 300 to the changed state (S810). That the upper address of the write-requested sector does not match with the upper address of any cache segment 300 which is not in the invalid state is called "occurrence of a write cache miss" or simply "write cache miss".

The cache controller 220 writes data in the cache segment 300 selected to be newly allocated or the cache segment 300 which is not in the invalid state and whose upper address matches with the upper address of the write-requested sector (S820). Next, the cache controller 220 updates the sector information field 410 corresponding to the data-written cache segment 300 to set the data-written sector to a valid sector (S830). Next, the cache controller 220 transitions the state of the cache segment 300 according to whether setting the sector to a valid sector has made all the sectors in the cache segment 300 become valid sectors (S840). According to the status transition, the cache controller 220 resets the LRU value of the cache segment 300 to a value indicating the shortest unused period.

Then, the cache controller 220 updates LRU values corresponding to other cache segments 300 in the same state as the transitioned state to values indicating a longer unused period (S850). In a case where the unit of writing to the main memory 200 is a block including a plurality of cache segments 300, not a single cache segment 300, those cache segments 300 which belong to the same block are subjected to a write-back process at the same time, so that it is desirable that the LRU values of the cache segments 300 should be the same. This makes it desirable that the cache controller 220 should further update the LRU values in the following procedures.

When the cache controller 220 has allocated a new cache segment 300 and has set the state thereof to the changed state or has newly written data in a cache segment 300 already allocated, the cache controller 220 resets the LRU value of the cache segment 300 to a value indicating the shortest unused period. Then, the cache controller 220 selects all the other cache segments 300 in the changed state which store data of the same block as the LRU-value reset cache segment 300. Then, the cache controller 220 resets the LRU values of the selected cache segments 300 to a value indicating the shortest unused period. This process can allow cache segments 300 in the same block to be the write-back targets at the same time, thus reducing the number of write-back processes needed. This can make the overall process efficient.

Figure 9A:
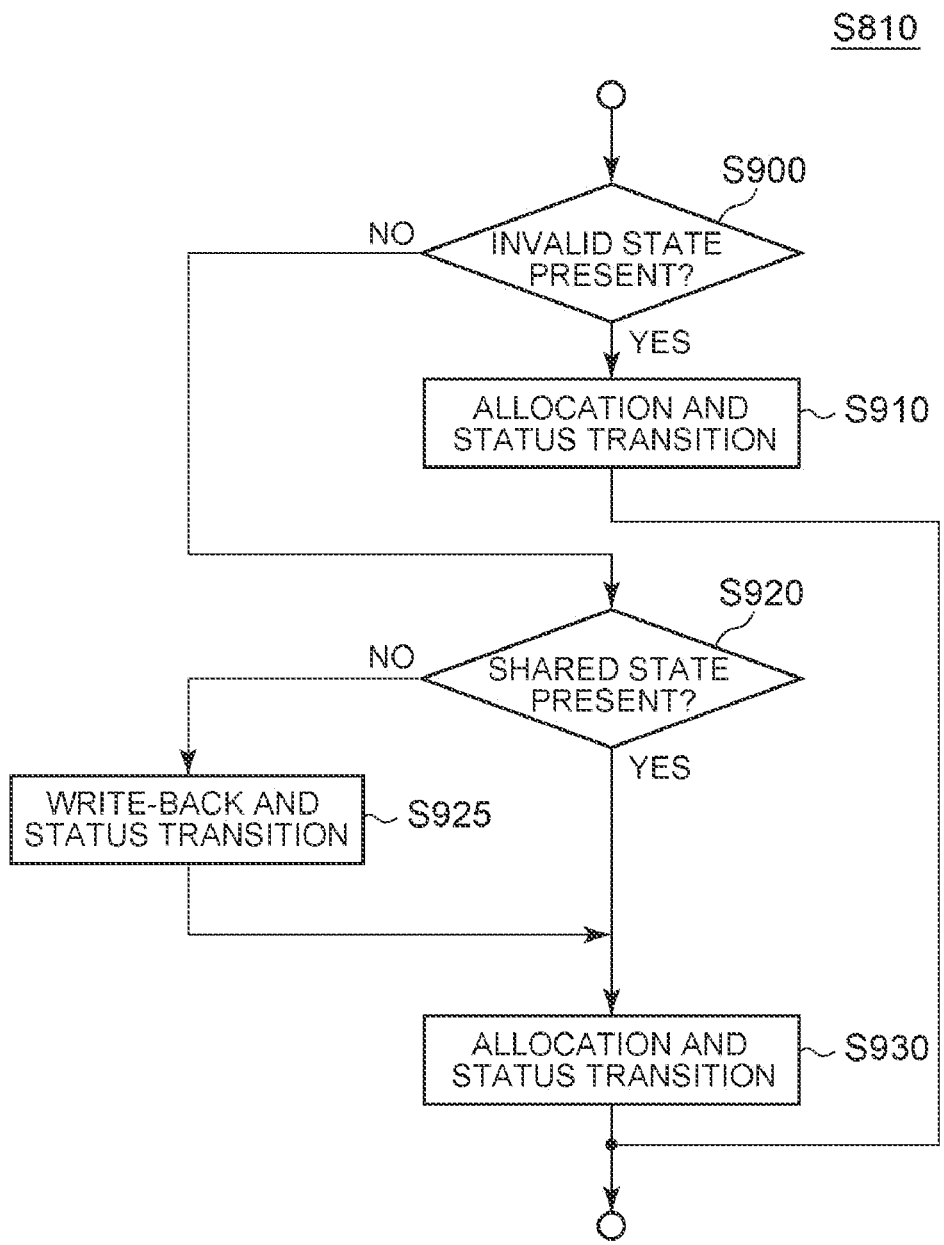
FIG. 9A is a diagram showing the details of the process of S810.
Figure 9B:
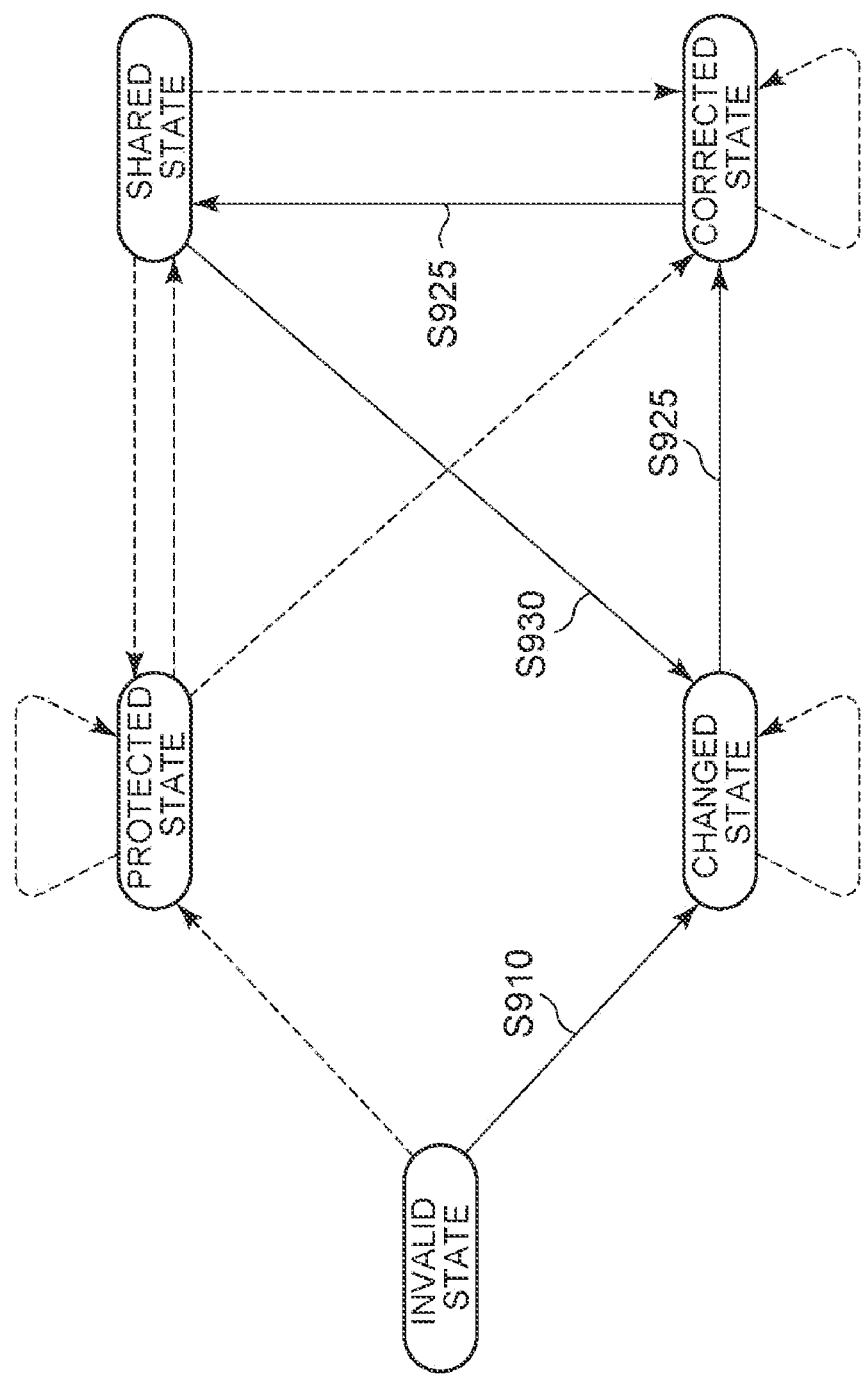
FIG. 9B is a diagram showing a possible status transition in the process of S810.

FIG. 9A shows the details of the process of S810. FIG. 9B shows a possible status transition in the process of S810. Referring to FIGS. 9A and 9B, the details of the process of S810 will be described below. First, the cache controller 220 determines whether the cache memory 210 includes any cache segment 300 in the invalid state (S900). Under a condition that the cache memory 210 includes a cache segment 300 in the invalid state (S900: YES), the cache controller 220 allocates the cache segment 300 to cache data to be written, and sets the state of the cache segment 300 to the changed state (S910). According to the allocation, the cache controller 220 sets those sectors other than the write-target sector to invalid sectors. At this point of time, cache-in from the main memory 200 is not carried out.

When there is no cache segment 300 in the invalid state (S900: NO), the cache controller 220 determines whether the cache memory 210 includes a cache segment 300 in the shared state (S920). As a write cache miss has occurred at the time of making the determination, the determination target is a cache segment 300 which is allocated to store data at an address other than the write-requested address. Under a condition that the cache memory 210 includes a cache segment 300 in the shared state (S920: YES), the cache controller 220 allocates the cache segment 300 to cache data to be written, and sets the state of the cache segment 300 to the changed state (S930). At this point of time, cache-in from the main memory 200 is not carried out.

As cache-in from the main memory 200 is not carried out at this point of time, and cache-in is delayed to a later write-back time (e.g., S765, S925 or S1310), thereby reducing the amount of data to be read out and making the process efficient.

When the cache memory 210 includes a plurality of cache segments 300 in the shared state, a cache segment 300 to be allocated may be selected therefrom based on the LRU value. For example, the cache controller 220 selects a cache segment 300 whose LRU value indicates the longest unused period and allocates the cache segment 300 to cache write data. According to the allocation, the cache controller 220 resets an LRU value corresponding to the cache segment 300 to a value indicating the shortest unused period.

When the cache memory 210 includes neither a cache segment 300 in the invalid state nor a cache segment 300 in the shared state (S920: NO), the cache controller 220 selects a cache segment 300 in either the changed state or the corrected state, reads data from the main memory 200 into an invalid sector in the cache segment 300, writes the data back in the main memory 200, and sets the cache segment 300 to the shared state (S925). Then, the cache controller 220 allocates the cache segment 300 to cache data to be written, and sets the state of the cache segment 300 to the changed state (S930). When there are a plurality of cache segments 300 in the changed state or the corrected state, a cache segment 300 in the changed state is selected by priority over a cache segment 300 in the corrected state. When there are cache segments 300 in the same state, a cache segment 300 whose LRU value indicates a indicating the longest unused period is selected.

In this manner, in response to a write cache miss, the cache controller 220 allocates a new cache segment 300 selected from those cache segments 300 which are not in the protected state to cache write data. As a result, a cache segment whose data has been read out already and which has been set to the protected state can be protected from rewriting (also called "replacing", "cache-out" or "reallocation") for holding data to be read out, even if a write cache miss occurs thereafter consecutively.

Figure 10A:
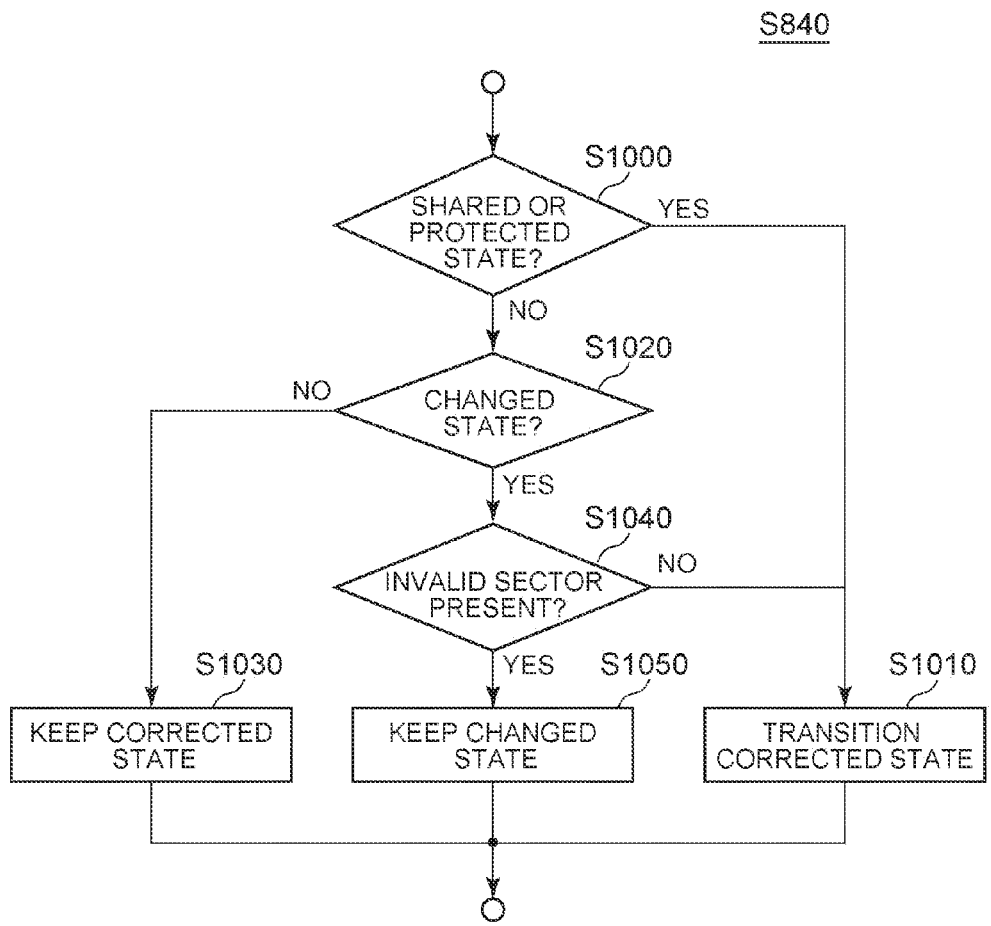
FIG. 10A is a diagram showing the details of the process of S840.
Figure 10B:
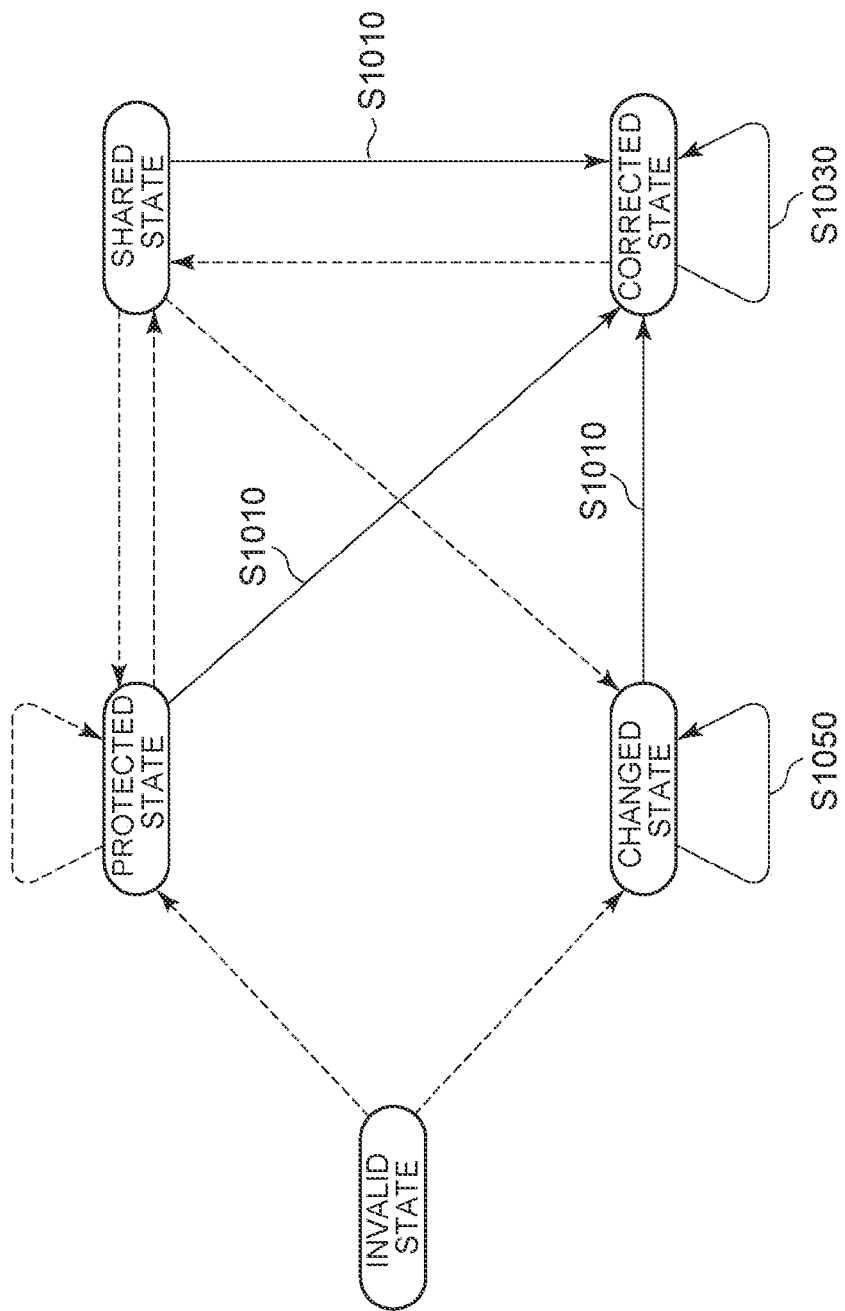
FIG. 10B is a diagram showing a possible status transition in the process of S840.

FIG. 10A shows the details of the process of S840. FIG. 10B shows a possible status transition in the process of S840. First, the cache controller 220 determines whether the write target is a cache segment 300 in the shared state or the protected state (S1000). When the write target is a cache segment 300 in the shared state or the protected state (S1000: YES), the cache controller 220 sets the state of the cache segment 300 to the corrected state (S1010). In this case, the cache segment 300 can keep caching data to be read out thereafter. When the state of the cache segment 300 is neither the shared state nor the protected state (S1000: NO), the cache controller 220 determines whether the state is the changed state (S1020).

When the state is not the changed state (S1020: NO), the state is the corrected state, so that the cache controller 220 keeps the state of the cache segment 300 set to the corrected state (S1030). This is because even if new valid data is written in the a cache segment 300 originally including only valid sectors, the state of including only valid sectors does not change.

When the state of the cache segment 300 is the changed state (S1020: YES), the cache controller 220 determines whether the cache segment 300 still includes an invalid sector (S1040). That is, it is determined whether valid data has been written in all invalid sectors through the data writing. Under a condition that the cache segment 300 includes an invalid sector (S1040: YES), the cache controller 220 keeps the state of the cache segment 300 set to the changed state (S1050). Under a condition that the cache segment 300 does not include an invalid sector (S1040: NO), the cache controller 220 sets the state of the cache segment 300 to the corrected state (S1010).

Figure 11A:
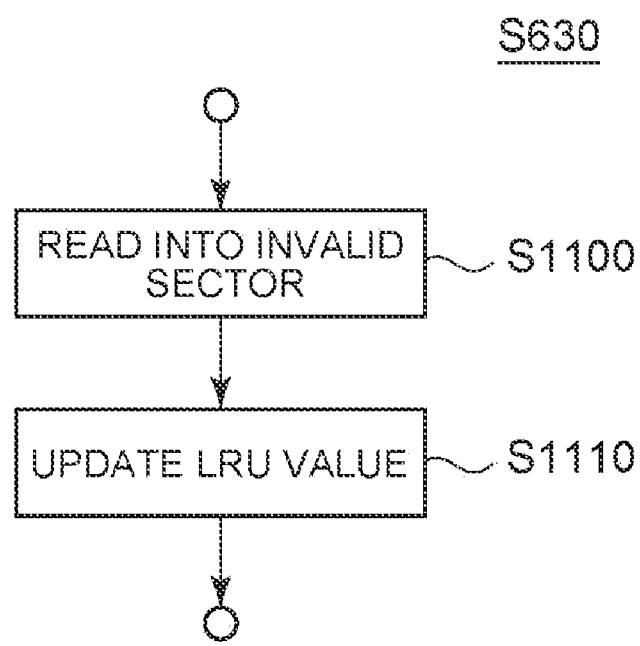
FIG. 11A is a diagram showing the details of the process of S630.
Figure 11B:
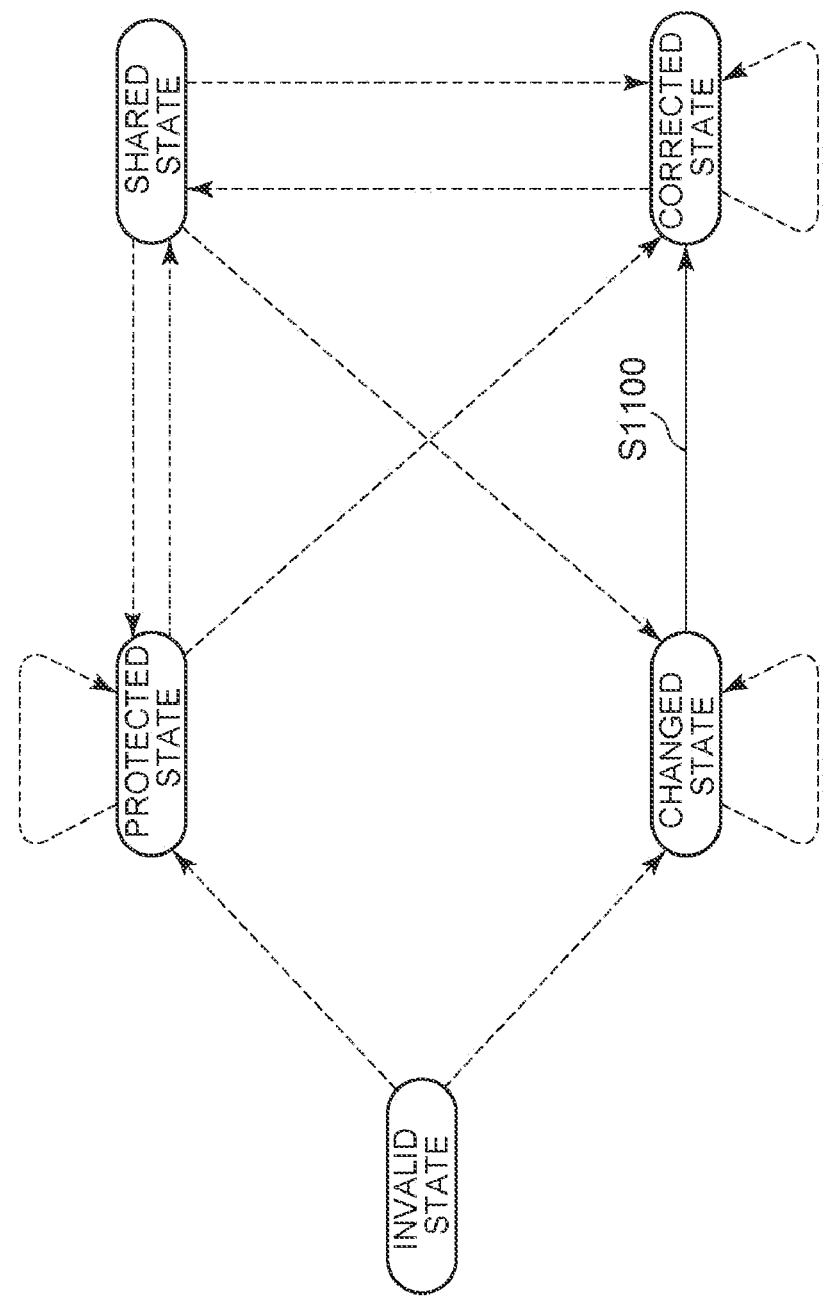
FIG. 11B is a diagram showing a possible status transition in the process of S630.

FIG. 11A shows the details of the process of S630. FIG. 11B shows a possible status transition in the process of S630. Under a condition that the read-requested address is the address of an invalid sector in a cache segment 300, the cache controller 220 reads data from the main memory 200 into all invalid sectors including that invalid sector in the cache segment 300 (S1100). This can make data reading thereafter faster by using the generally-known property of data access. In this case, all the sectors included in the cache segment 300 become valid sectors, so that the state of the cache segment 300 is transitioned to the corrected state from the changed state.

Next, the cache controller 220 updates the LRU value of the cache segment 300 to a value indicating the shortest unused period (S1110). The cache controller 220 updates the LRU values of other cache segments 300 to values indicating a longer unused period. In addition, the cache controller 220 may write data in the cache segment 300 all of whose sectors have been set to valid sectors back in the main memory 200. As a result, the state of the cache segment 300 is transitioned to the shared state indicating that the cache segment 300 is holding data matching with data in the main memory 200. Further, to ensure effective use of data held in the cache segment 300 for later reading, the cache controller 220 may set the state of the cache segment 300 to the protected state. In this case, it is necessary to perform a process of keeping the total number of cache segments 300 in the protected state equal to or less than a reference number. Because this process is approximately the same as the one explained above referring to S740, S750 and S780 in FIG. 7A, its description will be omitted.

Figure 12A:
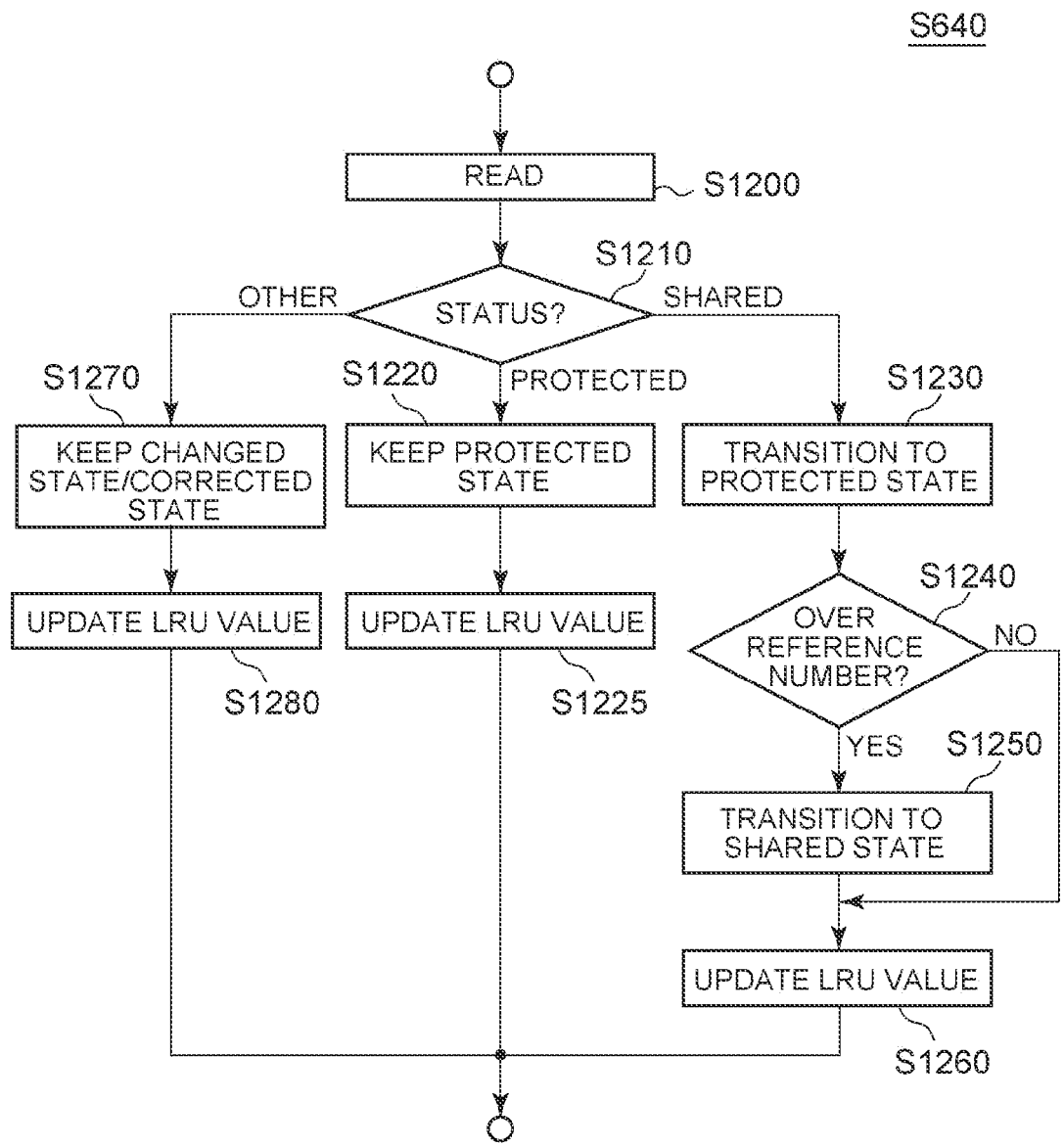
FIG. 12A is a diagram showing the details of the process of S640.
Figure 12B:
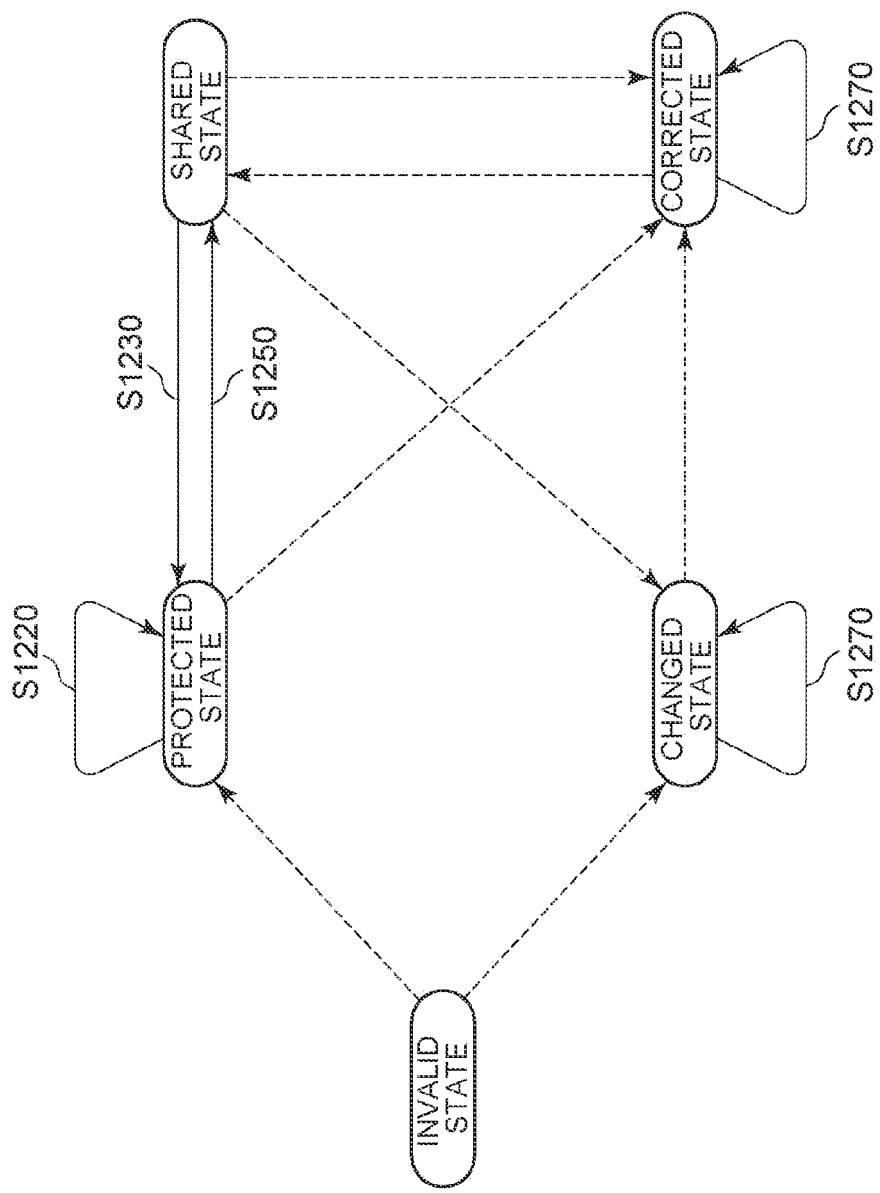
FIG. 12B is a diagram showing a possible status transition in the process of S640.

FIG. 12A shows the details of the process of S640. FIG. 12B shows a possible status transition in the process of S640. Under a condition that the read-requested sector is a valid sector in a cache segment 300, the cache controller 220 reads from the valid sector data to be output (S1200), and then executes the following processes. First, the cache controller 220 determines the state of the cache segment 300 (S1210). Under a condition that the state of the cache segment 300 is the shared state (S1210: SHARED), the cache controller 220 sets the cache segment 300 to the protected state (S1230), and resets the LRU value thereof to a value indicating the shortest unused period.

According to the setting, the cache controller 220 determines whether the total number of the cache segments 300 in the protected state exceeds a predetermined reference number (S1240). When the total number exceeds the predetermined reference number (S1240: YES), the cache controller 220 selects a cache segment 300 whose LRU value indicates the longest unused period from other cache segments 300 in the protected state, and sets the cache segment 300 to the shared state (S1250). Then, the cache controller 220 updates the LRU values of other cache segments 300 in the shared state to values indicating a longer unused period (S1260).

Under a condition that the cache segment 300 which has become the read target is in the protected state (S1210: PROTECTED), the cache controller 220 keeps the state of the cache segment 300 set to the protected state (S1220). Then, the cache controller 220 updates each of LRU values corresponding to other cache segments 300 in the protected state to a value indicating a longer unused period (S1225). It is desirable in this process that the cache controller 220 should update the LRU values of only those other cache segments 300 which have a shorter unused period than the cache segment 300 before being accessed. This makes it possible to prevent the LRU value from increasing unlimitedly and to predetermine the number of bits of the LRU value field 420.

Under a condition that the cache segment 300 which has become the read target is in another state (changed or corrected state) (S1210: OTHER), the cache controller 220 keeps the state of the cache segment 300 set to the changed state or the corrected state (S1270). Then, the cache controller 220 updates the LRU value of the cache segment 300 to a value indicating the shortest unused period (S1280), and updates the LRU values other cache segments 300 in the same state as the state of the former cache segment 300 to values indicating a longer unused period.

Figure 13A:
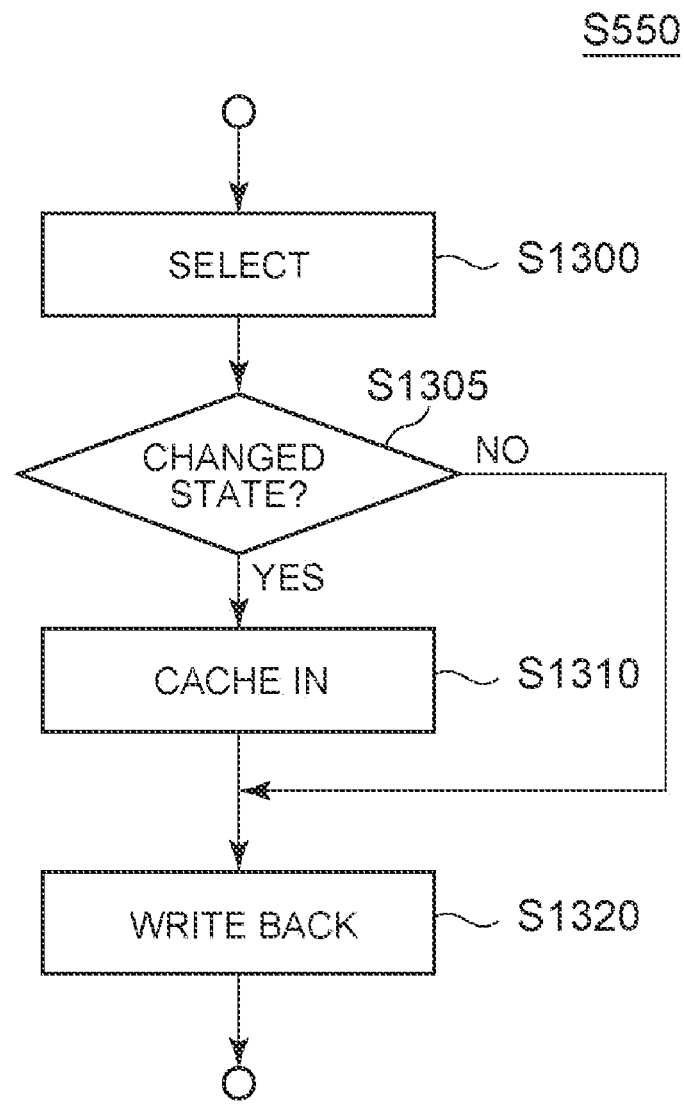
FIG. 13A is a diagram showing the details of the process of S550.
Figure 13B:
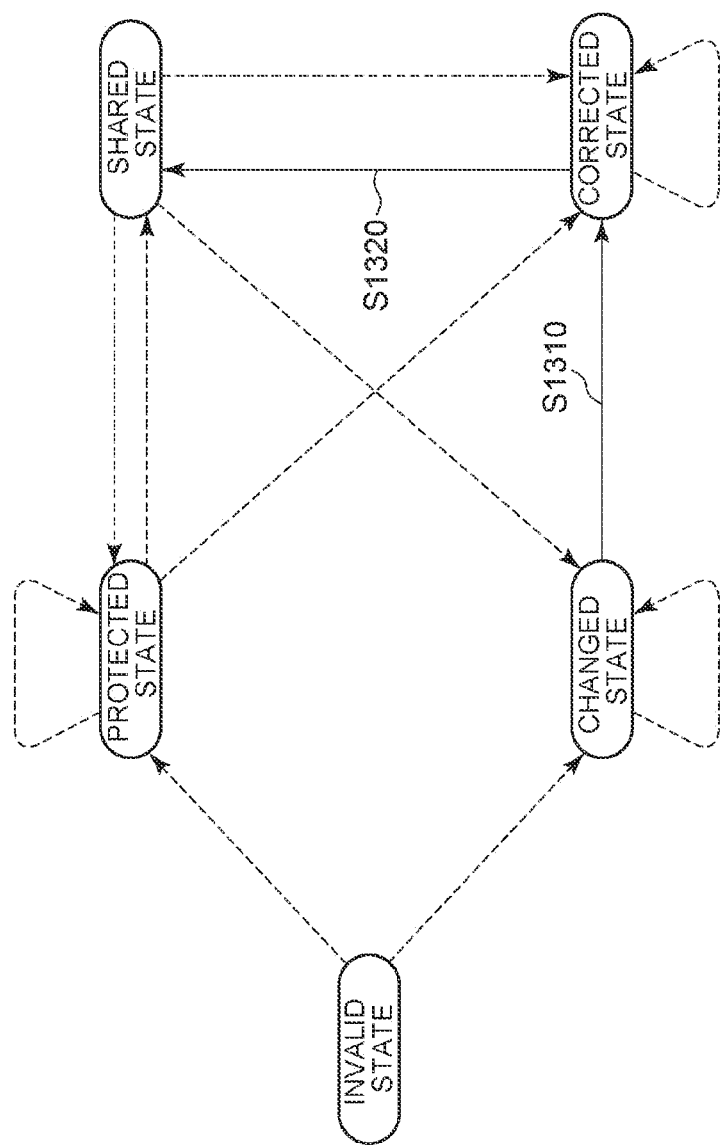
FIG. 13B is a diagram showing a possible status transition in the process of S550.

FIG. 13A shows the details of the process of S550. FIG. 13B shows a possible status transition in the process of S550. When a condition for writing data which is cached in the cache memory 210 but is not written in the main memory 200 is satisfied, first, the cache controller 220 selects a cache segment 300 in which the data is to be written back from those cache segments 300 which are in the corrected state or the changed state (S1300). For example, the priority order for the selection is as follows. First, the cache controller 220 searches the cache memory 210 for any cache segment 300 in the corrected state. When a plurality of cache segments 300 in the corrected state are retrieved, the cache controller 220 selects a cache segment 300 whose LRU value indicates the longest unused period. If there are a plurality of cache segments 300 having the same LRU value, the cache segments 300 belong to the same block, and are therefore selected together. When there is no cache segment 300 in the corrected state retrieved, the cache controller 220 searches for a cache segment 300 in the changed state. When a plurality of cache segments 300 in the changed state are retrieved, the cache controller 220 selects a cache segment 300 whose LRU value indicates the longest unused period. If there are a plurality of cache segments 300 having the same LRU value, the cache segments 300 belong to the same block, and are therefore selected together.

Next, the cache controller 220 determines whether the selected cache segment 300 is in the changed state (S1305). Under a condition that the selected cache segment 300 is in the changed state (S1305: YES), for an invalid sector in the cache segment 300, the cache controller 220 acquires data from a corresponding sector in the main memory 200 (S1310). At this point of time, the state of the cache segment 300 is transitioned to the corrected state. Then, the cache controller 220 writes data in the cache segment 300 acquired for the invalid sector or data in the cache segment 300 which has already been in the corrected state back in the main memory 200 cache segment 300 (S1320). In this case, the cache controller 220 sets the cache memory 210 in the shared state.

As apparent from the foregoing description of the embodiment, the storage device 20 can cache multiple writes to the same cache segment for the main memory 200 whose writing speed is slow, and collectively write those pieces of data back in the main memory 200 later. Further, a cache segment which has becomes a read target can be set to the protected state where the cache segment will not be replaced by later data writing. Even in consecutive writing operations, therefore, data to be read out can be kept held. This makes it possible to significantly improve the writing speed without sacrificing the efficiency of the read process without separately providing a read cache memory and a write cache memory.

Although the embodiment of the present invention has been described above, the technical scope of the invention is not limited to the scope of the above-described embodiment. It should be apparent to those skilled in the art that various changes and improvements can be made to the embodiment. It is apparent from the description of the appended claims that modes of such changes or improvements are encompassed in the technical scope of the invention.

The invention claimed is:

1. A storage device for caching data read from a main memory and data to be written in the main memory, comprising:
a cache memory having a plurality of cache segments, one or more cache segments holding data matching with data in the main memory being set in a protected state to protect the cache segments from a rewrite state, an upper limit of a number of the one or more cache segments being set in a protected state being a predetermined reference number; and
a cache controller that, in accordance with a write cache miss, allocates a selected cache segment selected from those cache segments which are not in the protected state to cache write data and writes the write data in the selected selected cache segment;
wherein each of the cache segments is in any one of a plurality of states including at least an invalid state where valid data is not included, the protected state, a shared state where data matches with data in the main memory but can be replaced with respect to data writing, and an update state where data to be written in the main memory is included, and
in accordance with the write cache miss, the cache controller selects as the selected cache segment:
a first cache segment if the first cache segment is in the invalid state;
else a second cache segment if the second cache segment is in the shared state;
else a third cache segment if the third cache segment is in the update state after writing data in the cache segment in the update state back in the main memory;
and then allocates the selected cache segment to cache write data;
wherein in accordance with the write cache miss,
if the selected cache segment is the second cache segment, the cache controller selects, as the second cache segment, from the cache segments in the shared state, a cache segment whose LRU value which is an index value indicating an unused period indicates a longest unused period, and
if the selected cache segment is the third cache segment, the cache controller writes data in at least one of those cache segments in the update state whose LRU values indicate a longest unused period back in the main memory, and selects, as the third cache segment, one of the cache segments whose data was written back to main memory;
wherein under a condition that the third cache segment in the update state is allocated to cache write data, the cache controller resets the LRU value of the allocated third cache segment and updates each of the LRU values of other cache segments in the update state to a value indicating a longer unused period; and
wherein the main memory can write data block by block, a block corresponding to a plurality of cache segments, and under a condition that the third cache segment in the update state is allocated to cache write data, the cache controller resets the LRU value of the allocated third cache segment and resets the LRU value of a fourth cache segment in the update state which stores data in a same block as the allocated fourth cache segment belongs.

2. The storage device according to claim 1, wherein the cache memory further includes a cache segment in an update state where data which does not match with data in the main memory and is to be written in the main memory is included, and
in accordance with a read cache miss, the cache controller allocates a fifth cache segment selected from those cache segments which are not in the update state to cache read-out data and reads data from the main memory into the selected fifth cache segment.

3. The storage device according to claim 2, wherein in accordance with the read cache miss, the cache controller further sets the allocated fifth cache segment in the protected state, and, under a condition that a number of cache segments set in the protected state exceeds the predetermined reference number, selects another cache segment in the protected state and sets the another cache segment in a shared state where data therein matches with data in the main memory but can be replaced with respect to data writing.

4. The storage device according to claim 3, wherein under a condition that the number of cache segments set in the protected state exceeds the reference number, the cache controller selects a cache segment whose LRU value, which is an index value indicating an unused period, indicates a longest unused period from those cache segments which are in the protected state and sets the selected cache segment in the shared state.

5. The storage device according to claim 4, wherein in accordance with the read cache miss, the cache controller further updates an LRU value of each cache segment in the protected state other than the allocated second cache segment to a value indicating a longer unused period.

6. The storage device according to claim 4, wherein in accordance with a read cache hit, under a condition that a read target is a cache segment in the protected state, the cache controller updates an LRU value of each of other cache segments in the protected state to a value indicating a longer unused period.

7. The storage device according to claim 1, wherein in accordance with a write cache hit, under a condition that a write target is a cache segment in the protected state, the cache controller writes data in the cache segment and sets the cache segment in the update state where data to be written in the main memory is included.

8. The storage device according to claim 1, further comprising the main memory.

9. The storage device according to claim 8, comprising a flash memory as the main memory.

10. The storage device according to claim 8, comprising at least one of a hard disk drive, a magnetooptical disk drive and a tape drive as the main memory.

11. The storage device according to claim 1, wherein each cache segment includes a plurality of sectors,
the cache memory stores an address value of a predetermined number of digits of an allocated cache segment in the main memory from a topmost address of the allocated cache segment, and sector information indicating whether the sectors included in each cache segment includes valid data, in association with each cache segment, and the cache controller determines that there is a write cache miss under a condition that an address value of a predetermined number of digits from a topmost one of addresses subjected to a write request does not match with any address value stored in the cache memory, and, under a condition that a sector in the cache segment which has a matched address value does not include valid data, writes data in the sector.

12. The storage device according to claim 11, wherein the cache memory stores a state of each cache segment and an LRU value which is an index value indicating an unused period of the cache segment in association with each cache segment, and in changing cache segments in one state to another state, the cache controller selects a cache segment whose LRU value indicates a longest unused period from those cache segments which are in the one state and changes the selected cache segment to the another state.

13. The storage device according to claim 1, wherein each cache segment includes a plurality of sectors, under a condition that writing to a sector results in a cache miss, the cache controller allocates another cache segment selected from the plurality of cache segments to cache data in a write target sector and sets a sector other than the write target sector to an invalid sector, in writing data in the another cache segment back in the main memory, for the invalid sector in the another cache segment, the cache controller acquires data from a corresponding sector in the main memory, and writes data in the another cache segment back in the main memory.

* * * * *